United States Patent Office 3,424,762
Patented Jan. 28, 1969

3,424,762
CERTAIN 3-UREIDOPYRROLIDINES
Grover C. Helsley, Richmond, Va., assignor to A. H. Robins Company, Incorporated, Richmond, Va., a corporation of Virginia
No Drawing. Filed Mar. 7, 1966, Ser. No. 532,125
U.S. Cl. 260—326.3         9 Claims
Int. Cl. C07d 27/04; A61k 27/00

ABSTRACT OF THE DISCLOSURE

New compounds which are 1-(3-pyrrolidinyl)-3-substituted ureas, having analgetic, central nervous system, and psycho-pharmacologic activities.

---

The present invention relates to certain novel heterocyclic organic compounds which may be referred to as substituted 3-ureidopyrrolidines, and is more particularly concerned with 1 - (3-pyrrolidinyl) - 3 - substituted ureas, compositions thereof, and methods of making and using the same.

The invention is especially concerned with novel 3-ureidopyrrolidines having the formula:

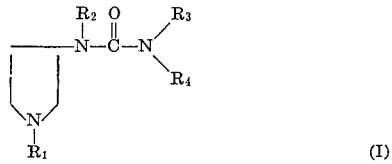

(I)

wherein $R_1$ is selected from the group consisting of hydrogen, lower-alkyl, phenyl, and benzyl,
wherein $R_2$ is selected from the group consisting of hydrogen, lower-alkyl, and phenyl,
wherein $R_3$ is selected from the group consisting of phenyl, lower-alkylphenyl, lower-alkoxyphenyl, halophenyl, and trifluoromethylphenyl, and
wherein $R_4$ is selected from the group consisting of lower-cycloalkyl, phenyl, lower-alkylphenyl, lower-alkoxyphenyl, halophenyl, and trifluoromethylphenyl,
and acid addition salts thereof.

The compounds of the invention having the foregoing Formula I are generally characterized by important pharmacological activity, and exhibit analgetic, central nervous system and psycho-pharmacologic activities. More specifically, the present compounds may be utilized in such applications as appetite suppression, CNS stimulation, anticonvulsant activity, and sedation. In addition, the compounds are relatively nontoxic and exhibit advantageous therapeutic ratios.

The activity of the active agents of the present invention has been evidenced by tests in lower animals. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

It is accordingly an object of the present invention to provide certain new and useful 1-(1-substituted-3-pyrrolidinyl)-3-substituted ureas, compositions thereof, and methods of making and using the same. Other objects of the invention will be apparent to one skilled in the art, and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, butyl, sec. butyl, tertiary butyl, amyl, isoamyl, hexyl, heptyl, octyl, and the like. "Lower alkoxy" has the formula —O-lower-alkyl. The term "lower-cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. "Phenyllower-alkyl" are groups such as benzyl, phenethyl, methylbenzyl, phenpropyl, and the like.

Among the suitable substituted phenyl radicals within the scope of $R_3$ and $R_4$ are phenyl radicals substituted by any radical or radicals which are not reactive or otherwise interfering under the conditions of reaction, such as lower-alkoxy, lower-alkyl, trifluoromethyl, and halo, e.g., fluoro, chloro, and bromo. The substituted-phenyl radicals have preferably no more than one to three substituents such as those given above and, furthermore, these substituents can be in various available positions of the phenyl nucleus and, when more than one substituent is present, can be the same or different and can be in various position combination relative to each other. The lower-alkyl and lower-alkoxy substituents each have preferably from one to four carbon atoms which can be arranged as straight or branched chains. A total of nine carbon atoms in all ring substituents is the preferred maximum.

When halogen is referred to herein, preferably but not necessarily a halogen of atomic weight in excess of nineteen but not greater than eighty is employed. Of the halogens, chlorine is preferred.

The compounds of Formula I may be converted to and are most conveniently employed in the form of nontoxic pharmaceutically acceptable acid addition salts. Such salts also have improved water-solubility. Although the nontoxic salts are preferred, any salt may be prepared for use as a chemical intermediate, as in the preparation of another but nontoxic acid addition salt. The free basic compounds of Formula I may be conveniently converted to their acid addition salts by reaction of the free base with the selected acid, preferably in the presence of an organic solvent inert to the reactants and reaction products under the conditions of the reaction. The acids which can be used to prepare the preferred nontoxic acid addition salts are those which produce, when combined with the free bases, salts the anions of which are relatively innocuous to the animal organism in therapeutic doses of the salts, so that beneficial physiological properties inherent in the free bases are not vitiated by side effects ascribable to the anions.

Appropriate acid addition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid. The preferred acid addition salt is the hydrochloride.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

The process of the invention comprises reacting a 3-aminopyrrolidine with a di-N-substituted carbamoyl halide, e.g., the chloride, as follows:

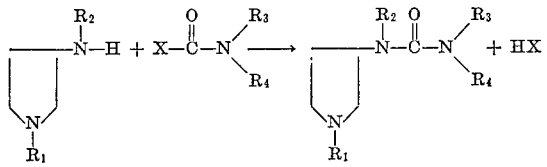

$R_1$ being other than hydrogen in this sequence,
wherein X is a replaceable halogen and the remaining symbols have the values previously assigned. For the preparation of a product wherein $R_1$ is hydrogen, debenzylation involving hydrogenolysis of the corresponding product wherein $R_1$ is benzyl is employed, vide

EXAMPLE 2

General method for preparation of substituted ureas using carbamoyl chlorides

A solution of one part of an appropriately substituted carbamoyl halide, e.g., chloride, in an inert solvent such as chloroform, toluene, or benzene, is mixed with one part of a primary or secondary 1-substituted-3-aminopyrrolidine also dissolved in a nonreactive solvent such as mentioned above. This reaction mixture may be heated at temperatures ranging from room temperature to the refluxing temperature of the solvent, preferably with mechanical stirring, until the reaction is essentially complete which usually requires 8 to 24 hours depending on the temperature and solvent used. Lower temperatures usually require an unnecessarily long reaction time, and higher ones may lead to side reactions and decomposition of the products. The reaction may be facilitated by the addition to the reaction mixture of one to two parts of an anhydrous basic salt such as sodium carbonate or potassium carbonate which will neutralize the formed hydrogen chloride. When such a salt is employed the reaction may be carried out at a lower temperature, such as room temperature; however, in order to assure completeness of the reaction, the mixture is usually finally heated at an elevated temperature (50–100° C.) for one to two hours.

When the reaction is complete, the mixture may be cooled in an ice bath and made basic with an aqueous alkali such as 2N sodium hydroxide. The organic layer is separated, washed with water, dried over a drying agent such as sodium sulfate, and the solvent is then removed at reduced pressure. The residual product is dissolved in ether and the ethereal solution extracted with approximately 6N hydrochloric acid or another suitable mineral acid. This acid solution is then made basic with aqueous alkali such as 25% NaOH and the oil which separates is dissolved in ether and dried over a drying agent such as magnesium sulfate. The ether is evaporated and the residue may usually be crystallized from a nonpolar solvent such as octane, isooctane, or isopropyl ether.

Salts of the basic products may be formed, particularly of those bases which are not crystalline, by reacting equimolar quantities of the basic ureidopyrrolidine and a mineral acid such as hydrochloric or sulfuric, or an organic acid such as fumaric, maleic, benzoic, or sulfamic acids, in a suitable solvent such as ethanol or isopropanol. The salts are purified by recrystallizing from solvents similar to those in which they are formed.

The process is more specifically described in the following examples which are given by way of illustration only and are not to be construed as limiting.

EXAMPLE 1

1-(1-benzyl-3-pyrrolidinyl)-3,3-diphenylurea

To a suspension of 15 g. of sodium carbonate in 100 ml. of chloroform were added 17.6 g. (0.1 mole) of 3-amino-1-benzyl-pyrrolidine and 23.2 g. (0.1 mole) of diphenylcarbamoyl chloride. The mixture was stirred at room temperature for 24 hours and then 50 ml. of water was added to the reaction flask. The organic layer was separated, dried over magnesium sulfate, and the solvent was evaporated. The residual oil which crystallized on standing was recrystallized from a benzene-isooctane mixture. The white compound weighed 28 g. (76% yield) and melted at 90–92° C. Recrystallization from the same solvent system did not change the melting point.

*Analysis.*—Calc. for $C_{24}H_{25}N_3O$: C, 77.60; H, 6.78; N, 11.31. Found: C, 77.67; H, 6.79; N, 11.20.

EXAMPLE 2

1-(3-pyrrolidinyl)-3,3-diphenylurea hydrochloride

A solution of 18.6 g. (0.05 mole) of 1-(1-benzyl-3-pyrrolidinyl)-3,3-diphenylurea in 200 ml. of 95% ethanol and 10 ml. of 12N HCl was placed in the reaction bottle of the catalytic reduction apparatus and ca. 10 g. of 10% palladium-on-charcoal catalyst was added. The mixture was shaken with hydrogen at about 60° C. until the pressure drop indicated one equivalent of hydrogen was absorbed. After cooling, the suspension was filtered, and the solvent evaporated at reduced pressure. The white crystalline residue was dissolved in hot benzene containing some isopropyl alcohol and the solution was filtered and treated with isooctane. The product which crystallized on cooling weighed 9 g. (60% yield) and melted at 208–209° C.

*Analysis*: Calc. for $C_{17}H_{20}ClN_3O$: C, 64.24; H, 6.34; N, 13.22; Cl, 11.16. Found: C, 63.90; H, 6.24; N, 13.14; Cl, 11.14.

EXAMPLE 3

1-(1-isopropyl-3-pyrrolidinyl)-3,3-diphenylurea fumarate

A mixture of 3.0 g. (0.025 mole) of 3-amino-1-isopropylpyrrolidine, 5.4 g. (0.025 mole) of diphenylcarbamoyl chloride, 6 g. of potassium carbonate and 50 ml. of chloroform was stirred at room temperature for 20 hours and then 50 ml. of cold water was added to the reaction flask. The organic layer was seperated and extracted with 6N hydrochloric acid. After the acid extracts were made basic, the oil which separated was extracted with ether. After the ether extracts were washed with water and dried over magnesium sulfate, the solvent was evaporated at reduced pressure. The residual oil weighed 5.5 g. (69% yield) and was shown by thin layer chromatography to be essentially pure.

To a hot solution of 2.0 g. (0.017 mole) of fumaric acid in 50 ml. of isopropanol was added a solution of 5.5 g. (0.017 mole) of the free base in 25 ml. of isopropanol. The mixture was heated for several minutes, filtered and the filtrate treated with 100 ml. of isopropyl ether. The white crystalline product which formed on cooling weighed 7.2 g. (97% yield) and melted at 178–179° C. The melting point was unchanged when a portion of the product was recrystallized again from the same solvent system.

*Analysis.*—Calc. for $C_{24}H_{29}N_3O_5$: C, 65.59; H, 6.65; N, 9.56. Found: C, 65.43; H, 6.72; N, 9.45.

EXAMPLE 4

1-(1-phenyl-3-pyrrolidinyl)-3,3-diphenylurea

A solution of 4 g. (0.025 mole) of 1-phenyl-3-aminopyrrolidine in 25 ml. of chloroform was added to a solution of 6 g. of potassium carbonate in 25 ml. of water. The two phase system was treated with 5.7 g. (0.025 mole) of diphenylcarbamyl chloride in 25 ml. of chloroform; then the reaction mixture was heated and allowed to reflux for 18 hours. The chloroform layer was separated, dried over magnesium sulfate and evaporated to a solid. Recrystallization of the crude solid from benzene-isooctane gave 7.6 g. (87%) of product which melted at 166–168° C. An analytical sample recrystallized from the same solvent system melted at 167–169° C.

Analysis.—Calc. for $C_{23}H_{23}N_3O$: C, 77.28; H, 6.49; N, 11.76. Found: C, 76.86; H, 6.23; N, 11.62.

EXAMPLE 5

1-(1-methyl-3-pyrrolidinyl)-3-cyclopentyl-3-phenylurea fumarate

A mixture of 2.5 g. (0.025 mole) of 3-amino-1-methylpyrrolidine, 5.6 g. (0.025 mole) of N-cyclopentyl-N-phenylcarbamoyl chloride, 6 g. of potassium carbonate and 50 ml. of chloroform was stirred at room temperature for 16 hours and finally refluxed for one hour. After the suspension was treated with 50 ml. of water, the organic layer was separated, washed with water and the solvent evaporated. The viscous residual oil was dissolved in ether and extracted with 6N HCl. The acid solution was made basic with 25% sodium hydroxide and the oil which separated was extracted with ether. The combined extracts were washed with water, dried over magnesium sulfate and the ether evaporated. The residual oil was shown to be essentially pure by thin layer chromatography.

To a hot solution of 1.4 g. (0.012 mole) of fumaric acid in 25 ml. of isopropanol was added a solution of 3.5 g. (0.012 mole) of the free base in 25 ml. of isopropanol. The mixture was heated several minutes, filtered, and the filtrate treated with about 300 ml. of isopropyl ether. The product which crystallized on standing weighed 1.5 g. (31% yield) and melted at 115–117° C. The white solid melted at 117.5–119° C. after it was recrystallized slowly from the same solvent system.

Analysis.—Calc. for $C_{21}H_{29}N_3O_5$: C, 62.51; H, 7.24; N, 10.41. Found: C, 61.67; H, 7.35; N, 10.16.

EXAMPLE 6

1-(1-ethyl-3-pyrrolidinyl)-1-methyl-3,3-bis(4-methylphenyl)-urea

Using the method of Example 1, equimolar amounts of 3-methylamino-1-ethylpyrrolidine and bis(4-methylphenyl)carbamoyl chloride are mixed and reacted together to give 1-(1-ethyl-3-pyrrolidinyl)-1-methyl-3,3-bis(4-methylphenyl)-urea.

EXAMPLE 7

1-(1-methyl-3-pyrrolidinyl)-1-isopropyl-3,3-bis(4-methoxyphenyl)-urea

Using the method of Example 1, equimolar amounts of 3-isopropylamino-1-methylpyrrolidine and bis(4-methoxyphenyl) carbamoyl chloride are mixed and reacted together to give 1-(1-methyl-3-pyrrolidinyl)-1-isopropyl-3,3-bis(4-methoxyphenyl)-urea.

EXAMPLE 8

1-(1-methyl-3-pyrrolidinyl)-1-phenyl-3,3-bis(4-chlorophenyl)urea

Using the method of Example 1, equimolar amounts of 3-anilino-1-methylpyroolidine and bis(4-chlorophenyl) carbamoyl chloride are mixed and reacted together to give 1-(1-methyl-3-pyrrolidinyl)-1-phenyl-3,3-bis(4-chlorophenyl)-urea.

EXAMPLE 9

1-(1-methyl-3-pyrrolidinyl)-3,3-bis(4-trifluoromethylphenyl)-urea

Using the method of Example 1, equimolar amounts of 3-amino-1-methylpyrrolidine and bis(4-trifluoromethylphenyl)carbamoyl chloride are mixed and reacted together to give 1-(1-methyl-3-pyrrolidinyl)-3,3-bis(4-trifluoromethylphenyl)-urea.

EXAMPLE 10

1-(1-phenyl-3-pyrrolidinyl)-3-cyclohexyl-3-phenylurea

Using the method of Example 1, equimolar amounts of 1-phenyl-3-aminopyrrolidine and cyclohexylphenyl carbamoyl chloride are mixed and reacted together to give 1-(1-phenyl-3-pyrrolidinyl)-3-cyclohexyl-3-phenylurea.

Formulation and administration

Effective quantities of any of the foregoing pharmacologically active compounds may be administered to a living animal body in any one of various way, for example, orally as in capsules or tablets, parenterally in the form of sterile solutions or suspensions, and in some cases intravenously in the form of sterile solutions. The free basic amino compounds, while effective, are preferably formulated and administered in the form of their nontoxic acid-addition salts for purposes of convenience of crystallization, increased solubility, and the like.

Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one hundred milligrams or even higher, depending of course upon the emergency of the situation and the particular result desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles. Results upon administration of these novel materials have thus far proved extremely promising.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of compounds having the formula

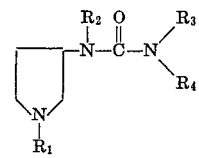

wherein $R_1$ is selected from the group consisting of hydrogen, lower-alkyl, phenyl, and benzyl, wherein $R_2$ is selected from the group consisting of hydrogen, lower-alkyl, and phenyl, wherein $R_3$ is selected from the group consisting of phenyl, lower-alkylphenyl, lower-alkoxyphenyl, halophenyl, trifluoromethylphenyl, and wherein $R_4$ is selected from the group consisting of lower-cycloalkyl, phenyl, lower-alkylphenyl, lower-alkoxyphenyl, halophenyl, and trifluoromethylphenyl, and acid addition salts thereof.

2. A compound of claim 1 which is 1-(1-benzyl-3-pyrrolidinyl)-3,3-diphenylurea.

3. A compound of claim 1 which is a 1-(3-pyrrolidinyl)-3,3-diphenylurea pharmaceutically acceptable acid addition salt.

4. A compound of claim 1 which is a 1-(1-isopropyl)3-pyrrolidinyl)-3,3-diphenylurea pharmaceutically acceptable acid addition salt.

5. A compound of claim 1 which is 1-(1-phenyl-3-pyrrolidinyl)-3,3-diphenylurea.

6. A compound of claim 1 which is 1-(1-methyl-3-pyrrolidinyl)-3-cyclopentyl-3-phenylurea.

7. A compound of claim 1 which is a 1-(1-methyl-3-pyrrolidinyl)-3-cyclopentyl-3-phenylurea pharmaceutically acceptable acid addition salt.

8. A compound of claim 1 which is 1-(3-pyrrolidinyl)-3,3-diphenylurea.

9. A compound of claim 1 which is a 1-1-(lower-alkyl-3-pyrrolidinyl)-3,3-diphenylurea.

No references cited.

NICHOLAS S. RIZZO, *Primary Examiner.*
JOSE TOVAR, *Assistant Examiner.*

U.S. Cl. X.R.
260—999